US012761163B2

(12) United States Patent
Faugier et al.

(10) Patent No.: US 12,761,163 B2
(45) Date of Patent: Oct. 13, 2026

(54) X-RAY INSPECTION SYSTEM AND CONTROL ARCHITECTURE FOR AN X-RAY INSPECTION SYSTEM

(71) Applicant: Smiths Detection France S.A.S., Vitry sur Seine (FR)

(72) Inventors: Jean-Michel Faugier, Vitry-sur-Seine (FR); Thibaut Berthelier, Vitry-sur-Seine (FR)

(73) Assignee: SMITHS DETECTION FRANCE S.A.S., Vitry-sur-Seine (FR)

( * ) Notice: Subject to any disclaimer, the term of this patent is extended or adjusted under 35 U.S.C. 154(b) by 100 days.

(21) Appl. No.: 18/572,987

(22) PCT Filed: Jun. 23, 2022

(86) PCT No.: PCT/GB2022/051595

§ 371 (c)(1),
(2) Date: Dec. 21, 2023

(87) PCT Pub. No.: WO2022/269256

PCT Pub. Date: Dec. 29, 2022

(65) Prior Publication Data

US 2024/0302296 A1 Sep. 12, 2024

(30) Foreign Application Priority Data

Jun. 25, 2021 (GB) ...................................... 2109203

(51) Int. Cl.

| | |
|---|---|
| ***G01N 23/04*** | (2018.01) |
| ***G01N 23/083*** | (2018.01) |
| ***G01N 23/10*** | (2018.01) |

(52) U.S. Cl.

CPC ........... *G01N 23/04* (2013.01); *G01N 23/083* (2013.01); *G01N 23/10* (2013.01); *G01N 2223/3303* (2013.01); *G01N 2223/401* (2013.01)

(58) Field of Classification Search

CPC ...... G01N 23/04; G01N 23/083; G01N 23/10; G01N 2223/3303; G01N 2223/401; G01V 5/22; G01T 1/175

See application file for complete search history.

(56) References Cited

U.S. PATENT DOCUMENTS 4,803,639 A * 2/1989 Steele .................. G06T 7/0004 378/58
6,178,224 B1 1/2001 Polichar et al.

(Continued)

FOREIGN PATENT DOCUMENTS

EP 2884269 A1 6/2015
EP 3187904 A1 7/2017

OTHER PUBLICATIONS

PCT International Search Report and Written Opinion, Application No. PCT/GB2022/051595, dated Sep. 20, 2022, 13 pages.

(Continued)

*Primary Examiner* — Courtney D Thomas
(74) *Attorney, Agent, or Firm* — Armstrong Teasdale LLP

(57) ABSTRACT

In one embodiment it is disclosed an x-ray inspection system including: a plurality of detector elements for detecting x-rays, the detector elements being positioned to detect x-rays from an inspection area; a control logic module, separate from the detector elements, the control logic module being configured to control operation of the detector elements and an x-ray source for the acquisition of x-ray inspection data, and to synchronise operation of the detector elements with operation of the x-ray source.

10 Claims, 3 Drawing Sheets

(56) References Cited

U.S. PATENT DOCUMENTS

| | | | | |
|---|---|---|---|---|
| 2011/0274242 | A1* | 11/2011 | Linev | G01V 5/223 378/57 |
| 2013/0094627 | A1 | 4/2013 | Lalleman et al. | |
| 2014/0161225 | A1 | 6/2014 | Bendahan et al. | |
| 2014/0185742 | A1 | 7/2014 | Chen et al. | |
| 2015/0160352 | A1* | 6/2015 | Tredwell | G01T 1/175 378/98.8 |
| 2019/0113652 | A1 | 4/2019 | Allen | |
| 2019/0235124 | A1 | 8/2019 | Lee et al. | |

OTHER PUBLICATIONS

UK Search Report, Application No. GB2109203.6, dated Dec. 24, 2021, 8 pps.

* cited by examiner

X-RAY INSPECTION SYSTEM AND CONTROL ARCHITECTURE FOR AN X-RAY INSPECTION SYSTEM

CROSS-REFERENCE TO RELATED APPLICATIONS

The present application is a national stage entry of PCT/GB2022/051595 filed on Jun. 23, 2022, which claims the benefit of GB Patent Application No. 2109203.6 filed on Jun. 25, 2021, the contents of which are hereby incorporated by reference in their entirety.

BACKGROUND

The present disclosure relates to an x-ray inspection system, and more particularly to the electronic and physical architecture of an x-ray inspection system, such as those of the type which may be used for inspection of vehicles and/or cargo at transit facilities.

Inspection systems illuminate an inspection target, such as a vehicle cabin or cargo, using penetrating radiation such as x-ray.

This is done to detect hidden objects, which may include contraband such as weapons, dangerous materials, explosives, or narcotics. Such inspection systems may be placed at borders and at the entrance of sensitive facilities, for example transit facilities, such as ports and airports. X-rays are typically used for inspection because X-rays are sufficiently penetrating to pass into and out from the interior of a vehicle or cargo container, but are also scattered by objects of interest, such as those listed above.

Traditional transmission X-ray machines may provide images in which image contrast exists between materials of different densities, due to the variation in x-ray intensity transmitted through these different materials to a detector. Generally such systems require X-rays to pass through the entire target to a detector located on the far side of the target.

Different types of x-ray machine exist—for example, in addition to such inspection systems back backscatter X-ray detects the radiation that reflects from the target. It has potential applications where less-destructive examination is required, and can operate even if only one side of the target is available for examination.

Most cargo inspection systems are transmission systems, and often are required to inspect large objects, such as a car, a pallet, the cargo compartment of a heavy goods vehicle, a shipping container, or the cab of a lorry.

In such systems the x-ray source and x-ray detectors must be separated by sufficient distance to allow the inspection target to be placed between them and must also be synchronised for the purposes of data acquisition and control and so forth.

It is a problem to provide systems which can meet both the physical constraints of system installation and the electronic constraints of data acquisition and control. It is still a further problem to enable such systems to be adapted and updated as technology develops.

BRIEF DESCRIPTION

Aspects and examples of the disclosure are set out in the appended claims and aim to address at least some of the above described technical problems and other problems.

Embodiments of the present disclosure provide a new detection line architecture for inspection systems, such as high energy systems for inspecting cargo. Embodiments may provide an independent control logic module, this may provide triggering function for triggering operation of the components of the system, and may be separate from the detector line(s) and radiation source. This module may be dedicated to synchronization of the inspection system's components.

In an aspect there is provided an x-ray inspection system including:

- a plurality of detector elements for detecting x-rays, the detector elements being positioned to detect x-rays from an inspection area;
- a control logic module, separate from the detector elements, the control logic module being configured to control operation of the detector elements and an x-ray source for the acquisition of x-ray inspection data, and to synchronise operation of the detector elements with operation of the x-ray source.

The control logic module may be mounted in a control assembly of the system. The plurality of detector elements may be provided in at least one detector assembly. The control assembly may be separate from the detector assembly.

The control assembly may be arranged to communicate real-time control signals from the control assembly to the detector assembly. The detector assembly may be arranged to communicate scan data to an image processing system via a non real-time communication link.

The real time control signals may be provided via at least one serial data communication link connecting the control logic module to the plurality of detector elements for providing real time data communication therebetween.

The at least one detector assembly may be secured to a gantry about said inspection area. The detector assembly may be connected to the control assembly via a wiring harness. The wiring harness may be secured to said gantry.

The system may include a filter operable to provide selective attenuation of illumination from the x-ray source, wherein the control logic module is connected to synchronise operation of the filter with operation of the detector elements.

The system may include an external synchronization interface, for communication of a synchronization signal with a remote device separate from the x-ray inspection system. The control logic module may be connected to the external synchronization interface, and configured to operate in one of a master mode and a slave mode, wherein in the master mode the control logic module provides the synchronization signal to the external synchronization interface for controlling operation of said remote device; and

- in the slave mode the control logic module obtains said synchronization signal from the external synchronization interface and synchronises operation of the detector elements and the x-ray source based on said synchronization signal.

In the master mode, the control logic module may be configured to trigger operation of at least one analogue to digital converter of said detector elements and the timing of said synchronization signal is based on said trigger.

In the slave mode, the control logic module may be configured to trigger operation of at least one analogue to digital converter of said detector elements in response to said synchronization signal.

An aspect provides a control logic module for performing data acquisition and control of an x-ray inspection system, the control logic including:

an x-ray source interface for communicating first control signals with an x-ray source to cause the x-ray source to illuminate an object to be inspected by the x-ray inspection system; and a detector element interface for providing second control signals to a plurality of detector elements separate from the control logic module, wherein the control logic module is configured to provide said control signals to synchronise operation of the detector elements with operation of the x-ray source.

The control signals may be further configured to trigger a data acquisition operation of the detector elements. The data acquisition operation may include an analogue to digital conversion.

The control logic module may further include at least one peripheral interface for communicating with a peripheral device of the x-ray inspection system, optionally wherein the peripheral device includes at least one of:

a filter operable to provide selective attenuation of illumination from the x-ray source, a passive detection element arranged to detect other forms of radiation coming from said object, a programmable logic controller, PLC, an image processing system, IPS, module configured to process data obtained from operation of the detector elements, and/or a radar, optionally wherein communicating includes providing and/or receiving control signals from the peripheral device.

The detector element interface and the x-ray source interface may include a serial data link for providing real time data communication.

The x-ray source interface may be further configured to receive first control signals from the x-ray source, and/or the detector element interface may be further configured to receive second control signals from the plurality of detector elements.

The control logic module may further include an external synchronization interface, for communication of a synchronization signal with a remote device separate from the x-ray inspection system.

The plurality of detector elements may include:

reference blocks for detecting reference x-rays emitted from the x-ray source and not illuminating the object;

detection lines for detecting x-rays from an inspection area after irradiation of the object positioned therein.

The control logic module may be part of any one or more of the x-ray inspection systems described and/or claimed herein There is also provided a control assembly for installation into an x-ray inspection system, the control assembly may include a chassis, having any of the control logic modules described or claimed herein secured thereto and wiring connections for connecting detector elements of x-ray inspection system to the detector element interface of the control logic module.

Embodiments may provide a platform which enables an inspection system to integrate a plurality of peripherals, and to synchronise those peripherals with the detector line electronics. This may have the advantage of allowing the inspection system to be flexible/adaptable enough to be reconfigured to support additional protocols and/or new interface requirements.

Embodiments may provide such advantages without the need for detector line electronics to be updated.

Embodiments may also reduce the need for external sub-systems to be connected to the detector line electronics with multiple and long cables.

Embodiments of the disclosure may centralize all the synchronization resources/function of an inspection system in one controller. This may simplify interconnections, interoperability with new sub-systems and minimize the cable length. This new module may be equipped with scalable I/O resources which can be independently and easily modified to comply with different standards. This controller may provide low-level synchronization with x-ray emissions.

Some particular embodiments are described below with reference to the drawings. These embodiments are presented with particular combinations of features. For the avoidance of doubt, the disclosure of this application is intended to be considered as a whole. Any feature of any one of the examples disclosed herein may be combined with any features of any of the other examples disclosed herein. The mere description of two features in collocation should not be taken to imply that either is essential to the other, nor inextricably linked to it.

Features of methods may be implemented in suitably configured hardware, and the functionality of the specific hardware described herein may be employed in methods which may implement that same functionality using other hardware.

BRIEF DESCRIPTION OF DRAWINGS

Embodiments of the disclosure will now be described in detail, by way of example only, with reference to the accompanying drawings, in which.

DETAILED DESCRIPTION

Figure 1:
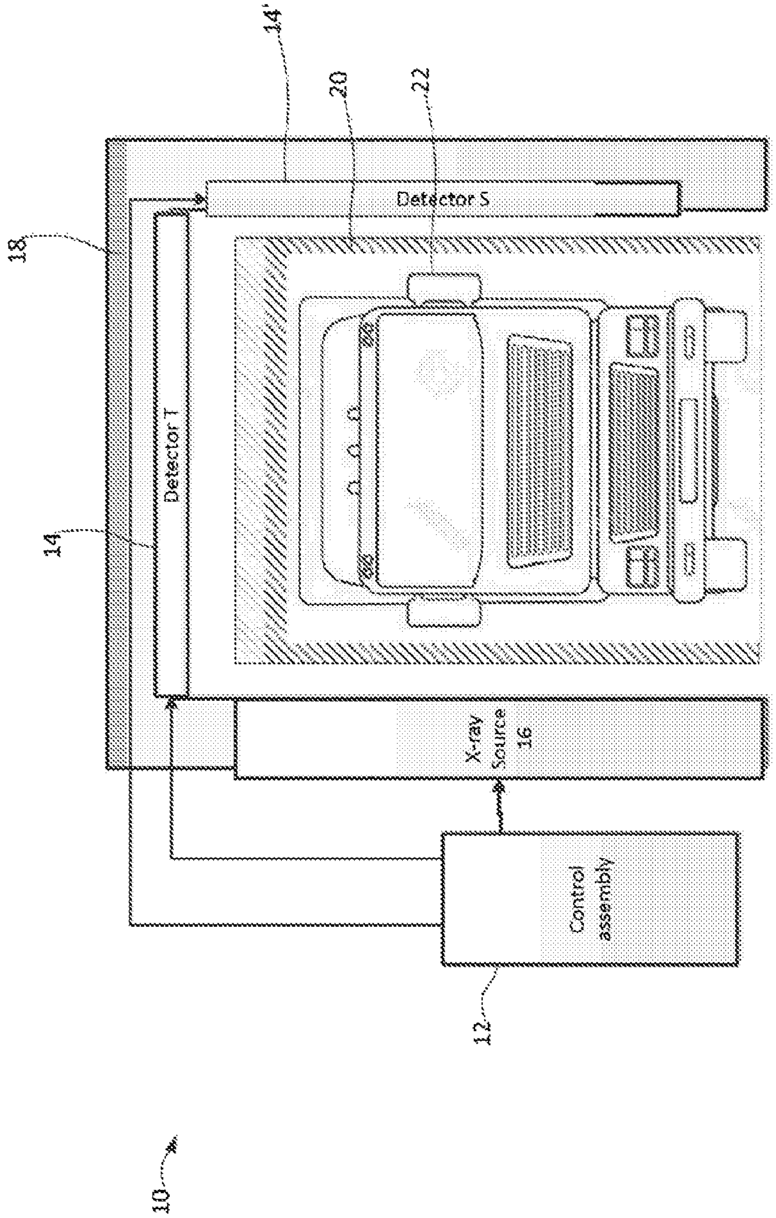
FIG. 1 illustrates an apparatus including an x-ray inspection system.

FIG. 1 illustrates an apparatus 10 including an x-ray inspection system 12, 14, 16 according to the present disclosure. As illustrated, this apparatus 10 includes a control assembly 12, housing a control logic module, and two detector assemblies 14, 14', each housing at least one detector element. In the example of FIG. 1, the two detector assemblies 14, 14' are configured to form an L-shaped detector line (also called an array of detectors). The apparatus also includes an x-ray source 16.

The control assembly 12 is separate from the detector assembly 14, 14' and from the x-ray source 16. Each of these three elements 12, 14, 14', 16 may be encapsulated (enclosed) separately and provided in separate housings, which may be connected by signal interconnections such as a wiring harness.

The control assembly 12 provides an independent triggering module dedicated to the top-level synchronization of the system 10 as a whole. This use of a separate control assembly for synchronization is in contrast to many other x-ray inspection systems in which synchronization of the apparatus is determined by the detector assemblies 14, 14'. This may provide an electronic design which is more flexible and able to support additional protocols and/or new interface requirements. This may also simplify interconnections, and may avoid the need to use multiple long cables to connect the various components of the system.

The apparatus 10 also includes a gantry 18. The x-ray source 16 and the detector assemblies 14, 14' are connected to the control assembly 12 by a wiring harness, which may be at least partially secured to the gantry and/or housed within conduits of the gantry.

A first one of the detector assemblies 14 (detector T) is secured to the top of the gantry. The other detector assembly (detector S) 14' is supported on a side of the gantry. The x-ray source 16 is supported on the other side of the gantry 18 opposite to the second detector assembly 14' for scanning an object 22 which passes through the gantry. The gantry 18 thus provides a scanning region 20, e.g. a volume which is illuminated by the x-ray source, and which is encompassed by a field of view of the x-ray detector assemblies 14, 14'.

The gantry 18 is large enough that an object 22 to be scanned, such as a car, a pallet, a cargo container and/or the cabin of a cargo vehicle can be disposed in the scanning region (e.g. between the x-ray source and the detector assemblies). For example, the gantry 18 may be arranged so that such a vehicle may be driven through the scanning region carrying a cargo container.

Figure 2:
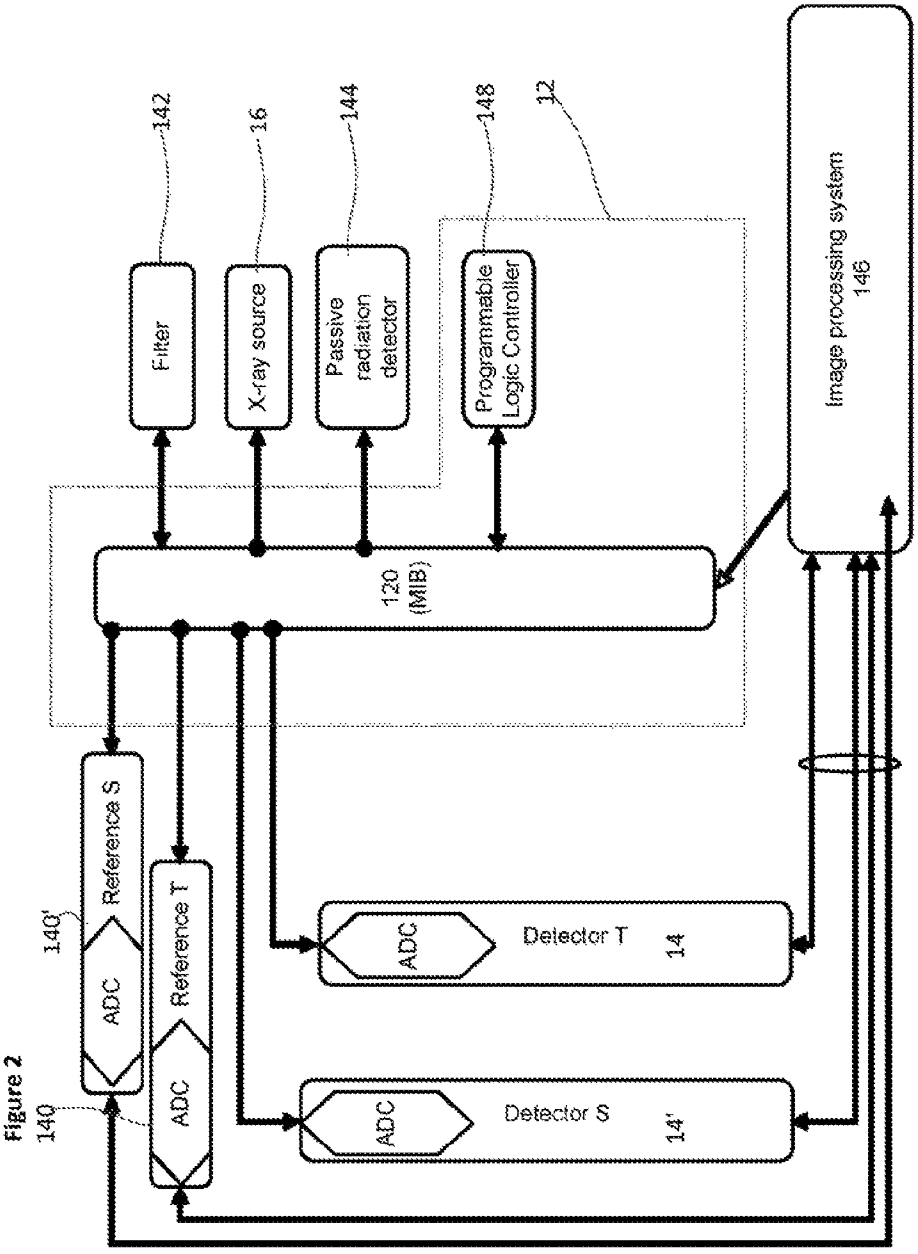
FIG. 2 is a functional block diagram of an x-ray inspection system according to the present disclosure.

FIG. 2 shows a functional black diagram of the electronic architecture of an x-ray inspection system such as that illustrated in FIG. 1. The system includes a control logic module, sometimes called "Master Interconnection Box", MIB, 120, an x-ray source for providing x-rays, and a plurality of detector assemblies 14, 14'. The system may also include a corresponding plurality of reference detectors 140, 140', one for each detector assembly 14, 14'. It may also include one or more the following:

a rotating filter 142,
a passive radiation detector, 144
a programmable logic controller, PLC 148, and
an image processing system, IPS 146.

The control logic module, MIB, 120 is connected to the reference detectors 140, 140' and to the detector assemblies 14, 14' by a real-time signal connection, such as a serial interface, which may operate according to a serial data protocol such as Synchronous Serial Interface (SSI) or Universal Asynchronous Receiver Transmitter (UART). The control logic module 120 is also connected to peripherals such as the rotating filter 142, the x-ray source 16, the passive radiation detector 144, and the programmable logic controller 148. The connection between the peripherals and the control logic module 120 may also be provided by the real-time signal connection (e.g. serial interface or a triggering signal).

The control logic module 120 includes an internal clock for providing synchronisation signals. It also includes a real time data communication interface, for real time input/output communications via the real time signal connections. It may also include timing and logic circuits for processing instructions and providing, via the serial i/o interface, control signals to:

(i) trigger operation of the detector assemblies 14, 14' (e.g. to cause the capture of signals, and/or the digitisation of data based on said signals),
(ii) trigger operation of the x-ray source e.g. to deliver a dose of x-ray radiation to the scanning volume.

A programmable logic controller, PLC, 148 may also be provided. This may be included in the control logic module 120, or may be provided as a separate circuit, such as a separate chip. This may include logic for providing control signals and for programming of the control logic module 120. This can enable low-level program instructions to be provided to the control logic module 120.

The control logic module 120 is thus operable to control the x-ray source 16, and to synchronise operation of the detector assemblies 14, 14' and the reference detectors 140, 140' with operation of the x-ray source 16.

The control logic module 120 is separate from the detector elements of the detector assemblies 14, 14' and is configured to control operation of both (a) the detector elements of the detector assemblies 14, 14' and (b) the x-ray source 16. It also synchronizes acquisition of x-ray inspection data from the detector elements of the detector assemblies 14, 14' and the reference detectors 140, 140' with operation of the x-ray source 16.

The detector assemblies (detector S, and detector T) 14, 14' include x-ray sensing elements, configured to provide electrical signals in response to x-ray radiation incident on the detectors 14, 14'. The detector assemblies 14, 14' also include an analogue front end, which couples the electrical signals from the sensing elements to an analogue-to-digital converter (ADC). The detector assemblies also include a detector line control unit (also referred to herein as a Concentrator Board 'COB'). The detector line control unit is configured to obtain a synchronisation signal from the control logic module 120 and to synchronise operation of the ADC with the synchronisation signal from the control logic module 120. The ADC thus provides raw data, digitised from the electrical signals from the sensing elements, to the COB. The COB encodes the raw-data for transmission over a serial data link, such as ethernet. For example, the COB may encode the data into frames and/or packets for transmission via a packet switched or label switched protocol such as User Datagram Protocol (UDP) based data transfer or Transmission Control Protocol (TCP). Data can thus be provided from the detector assemblies to the IPS for image reconstruction and analysis.

Unlike the detector assemblies 14, 14' the reference detectors (Reference S, Reference T) are disposed on the same side of the scanning region as the x-ray source and positioned for detecting the illumination provided by the x-ray source but which has not passed through the imaging region. The reference detectors (Reference S, Reference T) may include components which are identical to components of the detector assemblies (Detector S, and Detector T). The reference detectors may thus be configured to provide a reference detection signal for use in signal normalisation and image reconstruction by the image processing system, IPS, 146. When data is captured by the detector elements of the detector assemblies 14, 14' corresponding data may also be captured by the reference detectors 140, 140' and provided to the image processing system 146. The acquisition of such data may be synchronised under control of the control logic module 120 to enable the data from the detector elements of the detector assemblies 14, 14' to be normalised—e.g. to account for variability in source power or other variations.

It can thus be seen that the detector elements of the detector assemblies (Detector S, and Detector T) 14, 14' and the reference detectors 140, 140' combine analogue front-end components, and an A/D converter connected directly with the sensing elements of the detector assemblies. The output current signals generated by each sensing element (e.g. each pixel) are collected and digitalized simultaneously by the ADC so they can be provided (e.g.) by the COB to the image processing system, IPS 146.

The x-ray source 16 may include an accelerator, such as a linear accelerator, which has a control input connected to receive a trigger signal from the control logic module 120 for causing the x-ray source to emit a pulse (e.g. a dose) of x-ray radiation.

The detector elements of the detector assemblies and the reference detectors and the control logic module may all be connected to an image processing system, IPS, 146 by a data link, such as a local area communication interface, for example an ethernet link. The detector assemblies 14, 14' can thus provide digitised data to the image processing system 146, or to another remote device connected to this data link.

The image processing system, IPS, 146 generally includes a computer apparatus which may have a display and a user interface. The IPS 146 may be configured to receive digitised data from the reference detectors and from the detector assemblies (detector S, detector T). It may be configured to reconstruct x-ray images based on this digitised data, or to relay the data to a remote device for image reconstruction and/or inspection. The image processing system is also connected to the control logic module 120 for:

(i) obtaining imaging parameter data and/or (ii) providing control signals to the control logic module 120 to control imaging of an object in the scanning region.

The x-ray inspection apparatus may include a variety of different peripherals. One peripheral which may commonly be included is a rotating filter, 142 which may be mechanically coupled to the x-ray source and disposed between the x-ray source and the scanning region. The filter 142 may be arranged to be controlled by the control logic module 120. The filter 142 may include a set of x-ray attenuators, each configured to provide a different degree of attenuation of radiation from the x-ray source 16. The control logic module 120 is operable to control the filter 142 to provide a selected degree of attenuation of the x-ray radiation before the x-ray radiation reaches the scanning volume to interact with an object to be scanned.

Another peripheral which may be included is a passive radiation detector 144. This may include sensing elements configured to characterise neutrons and/or gamma-rays directly emitted from nuclear materials and radioactive sources, one example of such a detector includes a detector including a scintillation material, the signal of the detector being read out by a photo-multiplier tube (or equivalent: silicon photomultiplier.

In operation the control logic module 120 obtains low level program instructions from the programmable logic controller, PLC, 148 and controls operation of the x-ray source 16 and the detector elements of the detector assemblies 14, 14', and the references detectors 140, 140' in accordance with these instructions. This includes synchronizing the ADCs of the detector elements of the detector assemblies 14, 14', and the references detectors 140, 140' with pulses (doses) of x-ray radiation provided from the x-ray source 16 into the scanning volume. For each pulse, the control logic module 120 sends control signals via the serial interface, through the detector line control unit, COB, to control the ADCs to cause the ADCs to digitalize signals from the detector elements of the detector assemblies. This causes the detector line control unit, COB to concatenate and reorder the digital data. This digital data is then transferred from the detector line control unit, COB, on a high-speed data link (such as ethernet or equivalent) to the image processing system, IPS, which may provide an image workstation for image reconstruction and inspection. The IPS 146 may also relay such data to a remote device for inspection and/or storage and/or analysis. The control logic module also synchronizes operation of the peripherals, such as the filter, with the emission of pulses.

The control logic module 120 thus serves to:

- Synchronize operation of the x-ray source; and to
- Synchronize operation of the ADC of the detector elements, e.g. via the detector line control unit, COB.

It may also perform one or more of the following functions:

- Synchronize operation of the filter
- Synchronize operation of the passive radiation detector
- Acquire a signal from the filter indicating the degree of attenuation applied by the filter;
- Acquire low level program instructions from the programmable logic controller, PLC.

Figure 3:
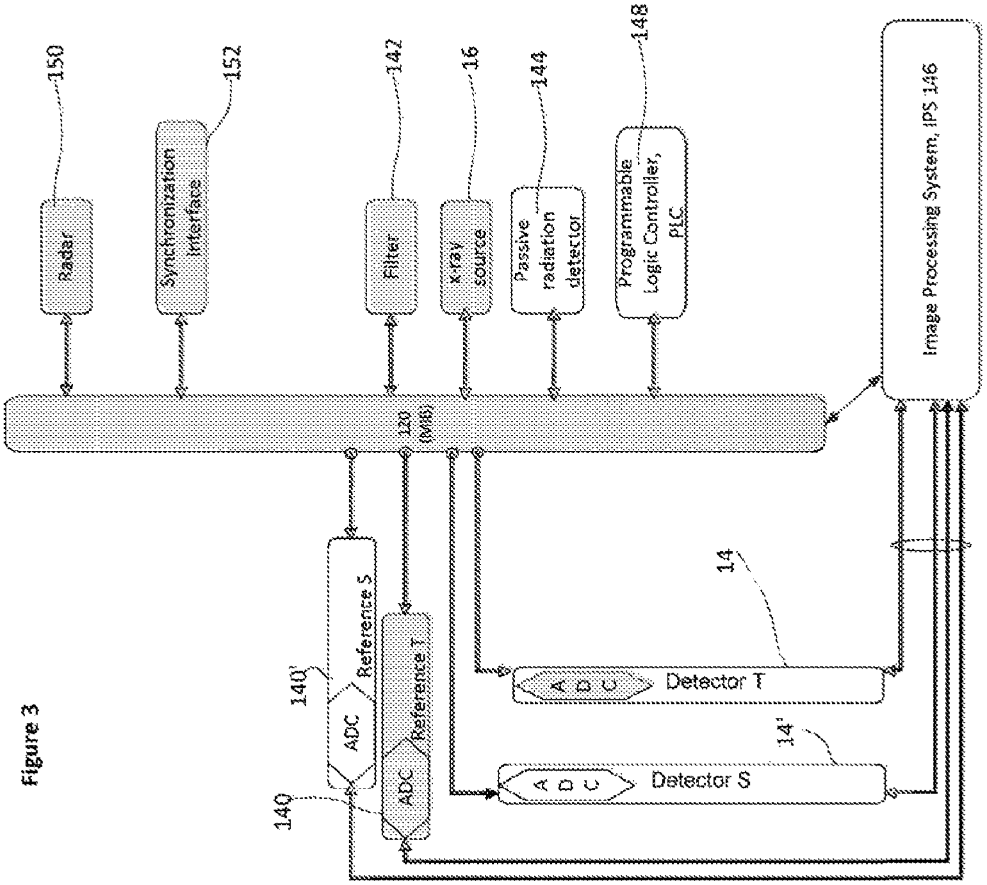
FIG. 3 is a functional block diagram of a further x-ray inspection system according to the present disclosure In the drawings like reference numerals are used to indicate like elements.

FIG. 3 shows a further x-ray inspection system according to the present disclosure. It can be seen that the system illustrated in FIG. 3 is identical to that shown in FIG. 2 and like reference numerals are used to indicate like elements. However, in addition to one or more of the optional peripherals (filter 142, passive radiation detector 144, PLC 146) included in the apparatus shown in FIG. 2, the apparatus shown in FIG. 3 may include further optional peripherals such as a speed sensing radar 150 and/or an external synchronization interface 152 for obtaining synchronization signals from a remote device and/or for providing such a signal as an output to control other x-ray inspection systems having such functionality.

In embodiments which include a speed sensing radar 150, the radar is configured to sense the speed at which an object to be inspected, such as a vehicle, is travelling. The control logic module 120 may obtain signals from the speed radar 150 indicating the speed of the object, and may control operation of the x-ray source and the detector elements of the detector assemblies based on these speed signals.

In embodiments which include an external synchronization interface 152, the control logic module 120 is connected to the external synchronization interface for communication of a synchronization signal with a remote device separate from the x-ray inspection system. The control logic module 120 can be configured to operate in either (a) a master mode or (b) a slave mode.

In the master mode, the control logic module 120 generates a synchronization signal and uses this to control operation of the ADC of the detector elements of the detector assemblies 14, 14' and/or the timing of operation of the x-ray source 16 as described above. It then also provides this synchronization signal (e.g. a co-timed signal based on these triggers) to the external synchronization interface 152. The external synchronization interface 152 then relays this signal for transmission to another x-ray inspection system, e.g. via an external synchronization interface of that other x-ray inspection system. If that other x-ray inspection system is operating in slave mode, it uses the synchronization signal to control the timing of its own x-ray source and its own detectors.

Conversely, when the x-ray inspection system shown in FIG. 3 is operating in the slave mode, the control logic module 120 obtains a synchronization signal from the external synchronization interface 152 and synchronises operation of the detector elements (e.g. to cause the acquisition and digitisation of sensor signals) and the x-ray source based on that synchronization signal. The synchronization signal need not originate from another x-ray inspection system and may be provided by any external timing reference signal.

It will be appreciated from the discussion above that the embodiments shown in the Figures are merely exemplary, and include features which may be generalised, removed or replaced as described herein and as set out in the claims.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality of the controller described herein may be provided by mixed analogue and digital processing and/or control functionality. It may include a general purpose processor, which may be configured to perform a method according to any one of those described herein. In some examples the controller may include digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media including program instructions operable to program a processor to perform any one or more of the methods described and/or claimed herein and/or to provide data processing apparatus as described and/or claimed herein. The controller may include an analogue control circuit which provides at least a part of this control functionality. An embodiment provides an analogue control circuit configured to perform any one or more of the methods described herein.

In some examples the synchronisation signals may be single or multi wire (differential) signals.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims. These claims are to be interpreted with due regard for equivalents.

The invention claimed is:

1. An x-ray inspection system comprising:

an x-ray source configured to illuminate an object to be inspected by the x-ray inspection system;

a plurality of detector elements for detecting x-rays, the detector elements being positioned to detect x-rays from an inspection area, the plurality of detector elements being provided in at least one detector assembly configured to be secured to a gantry about the inspection area, wherein the at least one detector assembly comprises:

an analogue-to-digital converter, ADC, and a detector line control unit, COB.

wherein the ADC is configured to provide raw data, digitized from electrical signals obtained from the plurality of detector elements, to the COB; and a control logic module for performing data acquisition and control of the x-ray inspection system, the control logic module comprising:

an x-ray source interface configured to provide and receive first control signals to and from the x-ray source to cause the x-ray source to illuminate an object to be inspected by the x-ray inspection system; and a detector element interface configured to provide and receive second control signals and from the plurality of detector elements separate from the control logic module, via the COB, wherein the COB is configured to obtain the second control signals from the control logic module and to synchronize operation of the ADC with the second control signals from the control logic module, wherein the control logic module is configured to be mounted in a control assembly of the system, wherein the detector element interface is configured to be connected to the plurality of detector elements, which are configured to be provided in the at least one detector assembly configured to be secured to a gantry about an inspection area, via wiring connections of a wiring harness secured to said gantry, wherein the control assembly is separate from each of the at least one detector assembly and is provided enclosed in a separate housing from a housing of each of the at least one detector assembly, wherein the control logic module is configured to provide and receive said first and second said control signals to synchronize operation of the detector elements with operation of the x-ray source, the control logic module further comprising at least one peripheral interface configured to provide control signals to and to receive control signals from a peripheral device of the x-ray inspection system, wherein the peripheral device comprises an image processing system, IPS, configured to process data obtained from the detector assemblies for image reconstruction and analysis, wherein the COB is configured to encode the raw data from the electrical signals from the plurality of detector elements for transmission to the IPS, for image reconstruction and analysis, wherein the control logic module is configured to provide imaging parameter data to the IPS and/or to obtain control signals from the IPS for controlling imaging of the object in the inspection area.

2. The x-ray inspection system of claim 1, wherein the first control signals are further configured to trigger a data acquisition operation of the detector elements.

3. The x-ray inspection system of claim 1, wherein the peripheral device further comprises at least one of:

a filter operable to provide selective attenuation of illumination from the x-ray source, a passive detection element arranged to detect other forms of radiation coming from said object, a programmable logic controller, PLC, and/or a radar.

4. The x-ray inspection system of claim 1, wherein the detector element interface and the x-ray source interface comprise a serial data link for providing real time data communication.

5. The x-ray inspection system of claim 1, further comprising an external synchronization interface, for communication of a synchronization signal with a remote device separate from the x-ray inspection system.

6. The x-ray inspection system of claim 1, wherein the plurality of detector elements comprise:

reference blocks for detecting reference x-rays emitted from the x-ray source and not illuminating the object; and detection lines for detecting x-rays from an inspection area after irradiation of the object positioned therein.

7. The x-ray inspection system of claim 1, further comprising a control assembly for installation into the x-ray inspection system of any of claims 1 to 6, the control assembly comprising a chassis, having a control logic module secured thereto and wiring connections for connecting the detector elements of the x-ray inspection system to the detector element interface of the control logic module.

8. The x-ray inspection system of claim 1, wherein the control assembly is arranged to communicate real-time control signals from the control assembly to the at least one detector assembly, optionally wherein the real time control signals are provided via at least one serial data communication link connecting the control logic module to the plurality of detector elements for providing real time data communication therebetween.

9. The x-ray inspection system of claim 1, further comprising a filter operable to provide selective attenuation of illumination from the x-ray source, wherein the control logic module is connected to synchronize operation of the filter with operation of the detector elements.

10. The x-ray inspection system of claim 1, comprising an external synchronization interface, for communication of a synchronization signal with a remote device separate from the x-ray inspection system, wherein the control logic module is connected to the external synchronization interface, and configured to operate in one of a master mode and a slave mode, wherein in the master mode the control logic module provides the synchronization signal to the external synchronization interface for controlling operation of said remote device; and in the slave mode the control logic module obtains said synchronization signal from the external synchronization interface and synchronizes operation of the detector elements and the x-ray source based on said synchronization signal, optionally wherein in the master mode, the control logic module is configured to trigger operation of at least one analogue to digital converter of said detector elements and the timing of said synchronization signal is based on said trigger, or wherein in the slave mode, the control logic module is configured to trigger operation of at least one analogue to digital converter of said detector elements in response to said synchronization signal.

* * * * *